United States Patent
Nair et al.

(10) Patent No.: US 11,803,800 B2
(45) Date of Patent: Oct. 31, 2023

(54) MACHINE LEARNING SYSTEMS AND METHODS FOR SELECTION, FILTERING OR PRESENTATION OF AVAILABLE SALES OUTLETS IN A DISTRIBUTED NETWORKED COMPUTING ENVIRONMENT

(71) Applicant: TrueCar, Inc., Santa Monica, CA (US)

(72) Inventors: Sharat Nair, Torrance, CA (US); Jake Swartz, Huntington Beach, CA (US); Victor Dave Choi, Davis, CA (US); Zheng Li, West Covina, CA (US)

(73) Assignee: TrueCar, Inc., Santa Monica, CA (US)

( * ) Notice: Subject to any disclaimer, the term of this patent is extended or adjusted under 35 U.S.C. 154(b) by 0 days.

(21) Appl. No.: 17/516,368

(22) Filed: Nov. 1, 2021

(65) Prior Publication Data

US 2022/0138660 A1 May 5, 2022

Related U.S. Application Data

(60) Provisional application No. 63/108,276, filed on Oct. 30, 2020.

(51) Int. Cl.
*G06Q 30/04* (2012.01)
*G06F 16/28* (2019.01)
(Continued)

(52) U.S. Cl.
CPC ..... *G06Q 10/06393* (2013.01); *G06F 16/285* (2019.01); *G06Q 30/0204* (2013.01)

(58) Field of Classification Search
CPC .......... G06Q 10/06393; G06Q 30/0204; G06F 16/285
See application file for complete search history.

(56) References Cited

U.S. PATENT DOCUMENTS 8,589,250 B2 * 11/2013 Noy .................. G06Q 30/0282
705/26.4
10,878,435 B2 12/2020 O'Keeffe
(Continued)

FOREIGN PATENT DOCUMENTS

CN 107153901 A * 9/2017

OTHER PUBLICATIONS

Bouwens et al. "Principals and their Car Dealers; what do Targets tell about their Relation" (2014) (https://www.hbs.edu/ris/Publication%20Files/14-107_92a1143a-ae58-45d5-886f-74552d1d02eb.pdf) (Year: 2014).*

*Primary Examiner* — Sujay Koneru
(74) *Attorney, Agent, or Firm* — Sprinkle IP Law Group

(57) ABSTRACT

Lead to recognition time delay data, leads and sales data, and lead distance data for leads arriving at a system within a time range can be used to determine a time variable close rate and a distance adjustment thereof which, in turn, can be used to generate a predicted close rate for each lead. Using the predicted close rate for each lead, an address drive distance for each lead, and dealer-level discount information, a logistic regression model can be trained to generate a score for each combination of a dealer, make, and zip code. Each score indicates a probability of closing a sale between a lead in the zip code and the dealer in the combination. Scores thus generated can be used by a computing facility in recommending dealers to a consumer in the zip code who has expressed an interest in purchasing a vehicle of the same make.

20 Claims, 8 Drawing Sheets

(51) Int. Cl.
*G06Q 10/0639* (2023.01)
*G06Q 30/0204* (2023.01)

(56) References Cited

U.S. PATENT DOCUMENTS

| | | | |
|---|---|---|---|
| 2003/0023498 A1* | 1/2003 | Benton | G06Q 30/06 705/14.1 |
| 2004/0039646 A1* | 2/2004 | Hacker | G06Q 10/087 705/22 |
| 2004/0064361 A1* | 4/2004 | Anderson | G06Q 30/0255 705/14.66 |
| 2007/0276810 A1* | 11/2007 | Rosen | G06F 16/38 |
| 2008/0015954 A1* | 1/2008 | Huber | G06Q 40/02 705/28 |
| 2008/0082528 A1* | 4/2008 | Bonzi | G06F 16/9535 707/999.005 |
| 2008/0162224 A1* | 7/2008 | Coon | G06Q 30/00 705/7.38 |
| 2008/0235077 A1* | 9/2008 | Harkness | G06Q 10/08 705/7.29 |
| 2009/0083130 A1* | 3/2009 | Hall | G06Q 10/06375 705/7.31 |
| 2010/0088158 A1* | 4/2010 | Pollack | G06Q 30/0629 705/26.1 |
| 2011/0161197 A1* | 6/2011 | Noy | G06Q 30/0205 705/347 |
| 2012/0130917 A1* | 5/2012 | Forsblom | G06Q 30/0282 705/347 |
| 2012/0303474 A1* | 11/2012 | Sanel | G06Q 30/08 705/26.4 |
| 2013/0151374 A1* | 6/2013 | Sims | G06Q 30/0605 705/26.35 |
| 2014/0032261 A1* | 1/2014 | Kotak | G06Q 30/02 705/7.29 |
| 2015/0095113 A1* | 4/2015 | Richards-Boeff | G06Q 30/0206 705/7.35 |
| 2015/0149237 A1* | 5/2015 | Brock | G06Q 10/0633 705/7.27 |
| 2015/0206087 A1* | 7/2015 | Tavares | G06Q 10/06393 705/7.34 |
| 2015/0310466 A1* | 10/2015 | LaCivita | G06Q 10/087 705/7.34 |
| 2016/0117626 A1* | 4/2016 | Baken | G06Q 10/06398 705/7.42 |
| 2016/0117702 A1* | 4/2016 | Chigurupati | G06Q 30/0204 705/7.33 |
| 2016/0232471 A1* | 8/2016 | Inman | G06Q 10/06393 |
| 2017/0287043 A1* | 10/2017 | Swinson | G06F 16/904 |
| 2018/0189812 A1* | 7/2018 | Swinson | G06Q 30/0201 |
| 2019/0019131 A1* | 1/2019 | O'Keeffe | G06Q 10/06393 |
| 2019/0043071 A1* | 2/2019 | O'Keeffe | G06Q 30/0203 |

* cited by examiner

| | make_id | postal_code | dealership_id | distance_rank | address_drive_distance | lead_dist_cir_after_adj | pct_discount |
|---|---|---|---|---|---|---|---|
| 0 | 43 | 501 | 1278 | 1 | 3.795143 | 0.120556 | 0.050433 |
| 1 | 43 | 501 | 240256 | 2 | 8.746497 | 0.079310 | 0.058067 |
| 2 | 43 | 501 | 30897 | 3 | 19.257550 | 0.038212 | 0.069210 |
| 3 | 43 | 501 | 2424 | 4 | 21.608954 | 0.034909 | 0.048892 |
| 4 | 43 | 501 | 119489 | 5 | 24.761932 | 0.053529 | 0.061917 |
| ... | ... | ... | ... | ... | ... | ... | ... |
| 95 | 23 | 544 | 42441 | 9 | 145.793594 | 0.006087 | 0.058067 |
| 96 | 23 | 544 | 2139 | 10 | 162.121322 | 0.006684 | 0.028404 |
| 97 | 23 | 544 | 38433 | 11 | 172.831306 | 0.007062 | 0.030323 |
| 98 | 23 | 544 | 8713 | 12 | 207.931786 | 0.006219 | 0.058067 |
| 99 | 23 | 544 | 8712 | 13 | 254.131936 | 0.006561 | 0.040798 |

MACHINE LEARNING SYSTEMS AND METHODS FOR SELECTION, FILTERING OR PRESENTATION OF AVAILABLE SALES OUTLETS IN A DISTRIBUTED NETWORKED COMPUTING ENVIRONMENT

CROSS-REFERENCE TO RELATED APPLICATION(S)

This application claims a benefit of priority under 35 U.S.C. § 119(e) from U.S. Provisional Application No. 63/108,276, filed Oct. 30, 2020, entitled "MACHINE LEARNING SYSTEMS AND METHODS FOR SELECTION, FILTERING OR PRESENTATION OF AVAILABLE SALES OUTLETS IN A DISTRIBUTED NETWORKED COMPUTING ENVIRONMENT," which is fully incorporated by reference herein for all purposes.

TECHNICAL FIELD

This disclosure relates generally to the presentation of sales outlets (also known as dealers) to a user of a website in a distributed computer network environment. In particular, this disclosure relates to the selection, filtering and/or presentation of dealers by artificial intelligence. Even more specifically, the present disclosure is related to machine learning systems, methods, and computer program products for the selection, filtering and/or presentation of available dealers to a user of a website.

BACKGROUND OF THE RELATED ART

Consumers are becoming savvier. This is especially true in the context of online purchasing, where research is easily accomplished. Consumers have therefore taken to searching for products or sales outlets (also referred to herein as vendors, sellers, dealers, etc.) online before executing a purchase.

As the popularity of searching for products or dealers online before a consumer executes a purchase continues to grow, there is an increasing need to develop systems and methods for presenting candidate dealers based on a user's preference or characteristics of the user or dealer. However, when a user seeks a dealer from which he/she can make a purchase of a product (which may be an onsite purchase or an online purchase), the candidate dealers may have characteristics that may cause the user to prefer some dealers over others. In fact, certain characteristics may result in the likelihood of sale for some vendors to be small, negligible, or non-existent. Similarly, different features of a consumer may also result in a difference in the probability of the consumer buying from a particular vendor.

In the current realm of online commerce, systems and methods exist for the filtering, selection, or presentation (collectively referred to as filtering) of dealers. Common dealer selection algorithm (DSA) approaches include listing all possible dealers to a user looking for an item in the inventories of those dealers (e.g., a dealer that is the closest to the user, a dealer that offers the lowest price for the item, a dealer that has the highest close rate, etc.), sometimes with an ability to sort the dealers by price, relevance, or other feature, or allowing the user to filter results by price, distance, or other product attribute. Examples of DSA approaches can be found in U.S. Pat. Nos. 8,589,250 and 10,878,435, which are incorporated by reference herein.

Dealers can experience similar prioritization difficulties as they receive large numbers of leads that often overwhelm the resources available to pursue potential consumers. For instance, dealers may have difficulty in efficiently and accurately identifying consumers who are more likely to purchase an item in which they have expressed interest (e.g., through a website on the Internet) from those who are less likely to purchase.

This kind of identification can be even more difficult when interactions between a dealer and a consumer take place in the online world as well as the physical world because, often times, there is a delay between when the consumer expresses, through an online channel or medium (e.g., a website, an app, a message, etc.) an interest to purchase a physical item from the dealer to when the consumer actually purchases the physical item.

In view of the foregoing, there is a need to better match dealers and consumers whose interactions may involve both the online world and the physical world. This disclosure can address this need and more.

SUMMARY OF THE DISCLOSURE

As alluded to above, a consumer may express an interest to purchase a physical item from a dealer through an online channel or medium and, often, there is a delay until the consumer actually purchases the physical item from the dealer, if a sale actually occurs. If the online channel or medium is owned and/or operated by the dealer, while it may take time, it is not impossible for the dealer to eventually identify the consumer (e.g., by matching the consumer's online identity and/or activities via the online channel or medium with information related to the sale of the physical item such as the purchaser's name, phone number, etc.).

However, if the online channel or medium is owned and operated by a third party (e.g., an intermediary) that is separate and independent from the dealer, it can be extremely difficult for the intermediary to correctly identify a user of the intermediary's system (which supports the online channel or medium) who has expressed an interest to purchase a physical item from a dealer with a consumer who actually purchased the physical item from the dealer. This is, in part, because the intermediary's system may not be privy to the dealer's sales activities taking place in the physical world, making it impossible for the intermediary's system to directly match a consumer's online identity and/or activities via the online channel or medium in the digital world with information related to the sale of the physical item in the physical world.

This data sufficiency problem can be made even worse in view of the delay between when the sale of the physical item takes place in the physical world to when the intermediary's system actually learns about the sale of the physical item. This delay may affect the intermediary's system's ability to accurately calculate the dealer's close rate and, in turn, may affect the intermediary's system's ability to correctly represent the dealer through the online channel or medium.

A goal of this disclosure is to increase the efficacy and/or efficiency in matching consumers and dealers in such scenarios. In some embodiments, this goal can be achieved with an enhanced approach for the filtering, selection and/or presentation of dealers based on machine learning so that consumer needs can be better matched with available dealers with whom a successful sale has a higher probability of occurring.

More specifically, a machine can be trained via a machine learning model to learn from dealer attributes. Input factors to the machine learning model can include drive distance (e.g., from an address to the dealer location), dealer close rate (which can be a predicted dealer close rate for each lead determined using another trained machine learning model based on the dealer's sales maturation and lead distance), dealer pricing (which is based on past sales prices from the dealer), zip code and distance (which measures the distance between a lead and the dealer location—a zip code can be used as a proxy for an actual address of the lead), and sales data (which can include transaction data from internal as well as external sources, including affiliated and/or non-affiliated dealers).

The trained machine learning model can then be used to process a plurality of dealer/configuration (e.g., vehicle year, make, and/or model)/zip code combinations in, for instance, a batch process, and generate a score for each dealer/configuration/zip code combination. The score indicates the probability of closing a sale between a consumer in the zip code looking to purchase an item of a particular configuration (e.g., a vehicle of a certain make) and a dealer in or close to the zip code and having the particular configuration.

In some embodiments, a system implementing a method disclosed herein may retrieve, from a database, lead to recognition time delay data, leads and sales data, and lead distance data for leads arriving at the system within a time range. The lead to recognition time delay data may comprise a time delay between a first date when a dealer makes a sale and a second date when transaction data corresponding to the sale is recorded by the system. The leads and sales data may contain leads submitted to the system through a website supported by the system. The lead distance data may comprise lead distances, each of the lead distances corresponding to a driving distance between a dealer zip code and a lead zip code.

In some embodiments, the system may apply a clustering model to the lead to recognition time delay data and the leads and sales data. In some embodiments, the clustering model comprises a k-means algorithm. The clustering model may produce a plurality of clusters, each of the plurality of clusters having a plurality of dealers. Dealers in each cluster may have similar lead to recognition time delay characteristics. In some embodiments, each cluster is associated with a set of rules. For instance, a rule may specify a time range for retrieving the leads. Another rule may specify a period of time for retrieving sales occurring before the leads are recognized (e.g., recorded) by the system.

In some embodiments, the system may determine a time variable close rate per dealer per make for each of the plurality of clusters. Further, the system may determine a distance adjustment for the time variable close rate thus determined per dealer per make based on a corresponding lead distance.

In some embodiments, the system may determine a predicted close rate for each of the leads in the leads and sales data based on the time variable close rate determined per dealer per make and the distance adjustment for the time variable close rate thus determined per dealer per make. The system may provide the predicted close rate for each of the leads in the leads and sales data as input to a logistic regression model.

In some embodiments, the logistic regression model is trained using the predicted close rate for each of the leads in the leads and sales data, an address drive distance for each of the leads in the leads and sales data, and dealer-level discount information. The logistic regression model thus trained may generate a score for each combination of a dealer, make, and zip code. This score indicates a probability of closing a sale between a lead in the zip code looking to purchase a vehicle of the make from the dealer in the combination. The system may provide the score to a computing facility. The computing facility can be configured for recommending a list of dealers based at least in part on scores generated by the logistic regression model thus trained.

In some embodiments, the system is operable to handle distance adjustment issues. For instance, the system may compare a time variable close rate of a dealer as adjusted by a distance adjustment, which is determined based on a first lead distance, with a national average close rate at the first lead distance and may generate a new curve by shifting a curve (or a copy thereof) representing the national average close rates across different lead distances upwards or downwards. The new curve represents the average lead distance close rates of the dealer across the different lead distances. The system may utilize the new curve to quickly locate an adjusted close rate of the dealer for a new lead at a second lead distance that is different from the first lead distance. In some embodiments, if the upward shift is significant, the system may apply a decaying differential technique to the new curve so that the new curve converges to the curve representing the national average close rates across the different lead distances.

In one embodiment, a system may comprise a processor, a non-transitory computer-readable storage medium, and stored instructions translatable by the processor to perform a method substantially as described herein. Another embodiment comprises a computer program product having a non-transitory computer-readable storage medium storing instructions translatable by a processor to perform a method substantially as described herein.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 7 illustrates an example of a database storing records populated with information about dealers in various zip codes, including time variable close rates of those dealers as adjusted by corresponding lead distances, according to some embodiments disclosed herein.

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Figure 1:
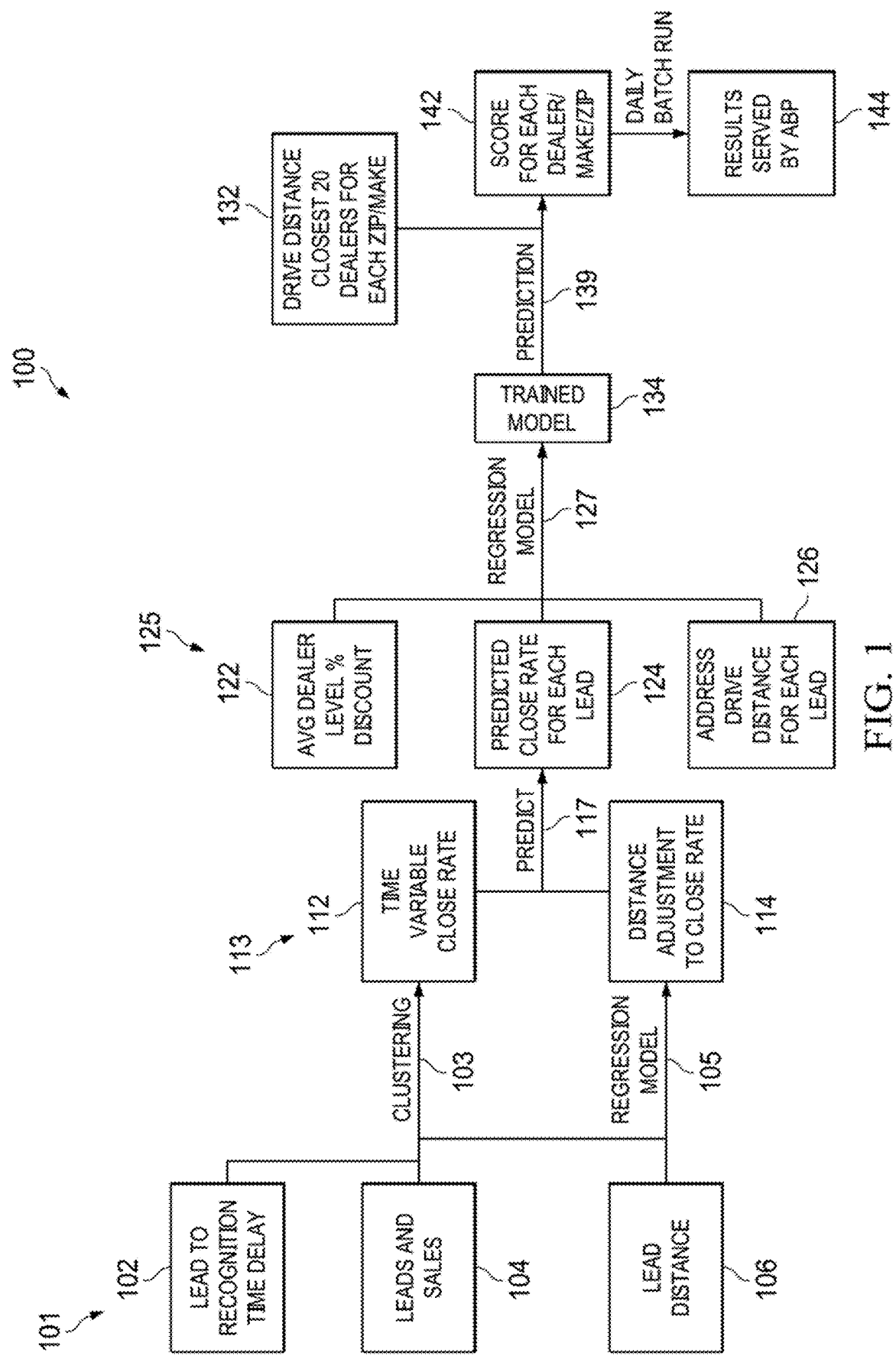
FIG. 1 is a flow diagram that illustrates a non-limiting example of a method for the selection, filtering, or presentation of available outlets in a distributed networked computing environment according to some embodiments disclosed herein.

FIG. 1 is a flow diagram that illustrates a non-limiting example of a method 100 for the selection, filtering, or presentation of available outlets in a distributed networked computing environment. A goal of method 100 is to compute, for each dealer in a set of dealers in a zip code, a score representing a likelihood of the respective dealer closing a sale with a lead interested in purchasing a vehicle from the respective dealer (e.g., score 142 for each dealer/make/zip code combination). The score indicates the probability of closing a sale between a consumer in the zip code looking to purchase an item of a particular configuration (e.g., a vehicle of a certain make) and a dealer in or close to the zip code and having the item of the particular configuration. A system implementing method 100 may run a batch process on a daily basis (or some other configurable time interval) and provide results (scores corresponding to dealer/configuration/zip code combinations) to an auto-buying platform (ABP) (e.g., a website supported by the system). The ABP, in turn, may utilize the results from method 100 in determining which dealers should be presented to a user of the ABP, when the user, who is associated with a certain zip code, expresses an interest in purchasing a vehicle of a particular make carried by the dealers (144).

In some embodiments, a vehicle data system (hereinafter referred to as the "system," such as a vehicle data system disclosed in U.S. Pat. No. 10,878,435 may be adapted for performing method 100. The system may represent an intermediary between dealers and consumers. The system may support a website through which certain dealers may be presented to a consumer and through which the consumer may express interest in purchasing a vehicle from one of the dealers thus presented by the system through the website. The intermediary may operate independently of the dealers and/or be owned by different entities.

In some embodiments, vehicle sales transactions may be provided by and/or obtained from sources such as the dealers through various channels. As described in U.S. Pat. No. 10,878,435, the system may collect data, including vehicle sales transactions, from disparate sources. Examples of sources may include the dealers themselves, a government agency, a data provider, etc.

In some embodiments, leads submitted through the website supported by the system are stored in a database maintained by the system. Each lead is stored with a lead submission time (e.g., based on a timestamp showing when the respective lead is submitted through the website). The vehicle sales transactions (which are collectively referred to herein as "sales") thus received and/or obtained can also be stored in the database. Each sale is stored with a lead to recognition time (e.g., based on a timestamp showing when the respective sale arrives at the system). Based on the lead submission time and the lead to recognition time, the system is operable to determine a lead to recognition time delay and store same in the database as part of lead to recognition time delay data 102. The leads and sales can also be stored in the database as leads and sales data 104.

For example, suppose on Day X, a website visitor selected a vehicle (e.g., of a particular year, make, model, body, and/or trim, collectively referred to herein as "YMMB/T") through the website and expressed an interest in purchasing a vehicle of the vehicle configuration from one of the dealers presented to the website visitor through the website (e.g., by providing contact information to the website and/or permitting the respective dealer to contact the website visitor). On Day Y, the system learns that the website visitor has purchased the vehicle from the respective dealer. In this example, Day X is the lead submission time, Day Y is the lead to recognition time, and Day X-Day Y is the lead to recognition time delay. The system may learn or be notified about the sale of the vehicle by the respective dealer to the website visitor by, upon receiving new sales, parsing out purchaser information (e.g., name, phone number, email, address, etc.) and vehicle information (e.g., make, YMMB/T, VIN, etc.) from the newly received sales and matching each purchaser and the corresponding vehicle purchased by the respective purchaser with each of the leads submitted through the website. The length of time of observation can be configurable (e.g., sales occurred past month, last week, etc.).

For each lead, the system may also determine a lead distance between the respective lead and each of the dealers. The system may calculate the lead distance based on a drive distance between an address or the center of a zip code provided by a lead and an address or the center of a zip code of a dealer. In some embodiments, the system may pre-calculate (i.e., independent of any lead submission) lead distances from all the zip codes within a certain driving distance from each of a configurable number of dealers per a zip code. For example, suppose a zip code has 20 dealers in, or closest in proximity to, the zip code. The system may pre-calculate lead distances for all the zip codes within 400 miles of each of the 20 dealers. The lead distances thus calculated can be stored in the database as lead distance data 106.

In some embodiments, method 100 may include retrieving, from the database, lead to recognition time delay data 102, leads and sales data 104, and lead distance data 106 for leads arriving at the system (e.g., through the website supported by the system) within a time range (e.g., October 1-October 15) (101). Lead to recognition time delay data 102, leads and sales data 104, and lead distance data 106 represent a plurality of input factors considered by the system in performing method 100. The input factor represented by lead to recognition time delay data 102 is new to the system. This input factor takes into consideration that there might be a long (e.g., a couple of months) or short (e.g., a day or two) time delay between when a dealer makes a sale and when transaction data corresponding to the sale actually arrives at the system (e.g., recorded by the system) and is thus recognized by the system, and hence is referred to herein as a "lead to recognition" time delay.

Figure 2:
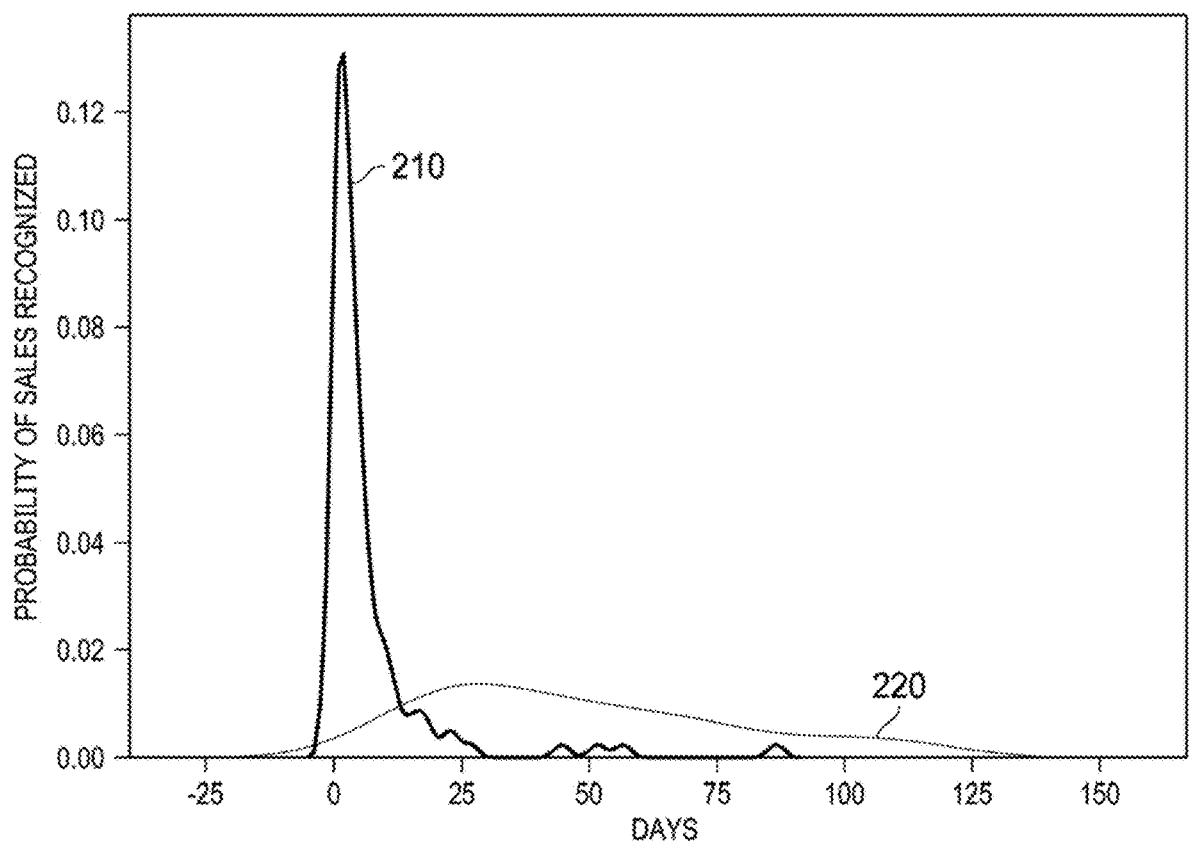
FIG. 2 is a plot diagram that exemplifies how two dealers can have distinctly different lead to recognition time delay characteristics according to some embodiments disclosed herein.

As exemplified in FIG. 2, different dealers can have distinctly different lead to recognition time delay characteristics. In the example of FIG. 2, the majority of sales at a first dealer may have a quick, a day or two delay between when the first dealer makes a sale (e.g., at day 0) and when transaction data about the sale being recognized by the system. This is represented in FIG. 2 by plot line 210 having a sharp peak close to day 0.

In comparison, the lead to recognition time delay for a second dealer is longer, which means sales at the second dealer are usually recognized by the system much more slowly. This is represented in FIG. 2 by plot line 220 having a gentle bump at about day 30). That is, for the first dealer, the probability of a sale at the first dealer being recognized by the system very quickly (e.g., at day 1 or day 2) can be significantly higher than the probability of a sale the second dealer being recognized by the system at the same time or in the same time range.

The inclusion of this input factor, lead to recognition time delay, more accurately reflects the lead to recognition characteristics of different dealers over time. In this way, sales recognized by the system (e.g., recorded by the system in the database) slowly can still be considered and dealers are not biased or penalized due to delays in the lead to recognition time. In turn, the inclusion of this input factor, lead to recognition time delay, helps the system to more accurately compute the probability of closing a sale to a lead from a certain geographic area.

In some embodiments, the recognition need not be made by the system. That is, the lead to recognition time delay can be determined in other ways. For example, the lead to recognition time delay can be determined based on the time between when the dealer makes the sale and when the dealer then reports the sale to a government agency (e.g., the Department of Motor Vehicle), between when the sale is reported to the government agency and when transaction data on the sale is obtained by a data provider, between when transaction data on the sale is obtained by the data provider and when the transaction data is obtained or received by the system, and so on.

Utilizing lead to recognition time delay data 102 and leads and sales data 104, the system can cluster a plurality of dealers (e.g., whether the dealers are affiliated with the system or not) based on each respective dealer's average number of days from a lead submission to the lead's recognition (i.e., an average "lead to recognition" time delay per lead). Accordingly, in some embodiments, method 100 may further include applying a clustering model to recognition time delay data 102 and leads and sales data 104 (103). K-means clustering is a non-limiting example of a clustering model that can be used for clustering the dealers. Other clustering models may also be suitable. K-means clustering is known to those skilled in the art and thus is not further described herein.

Figure 3:
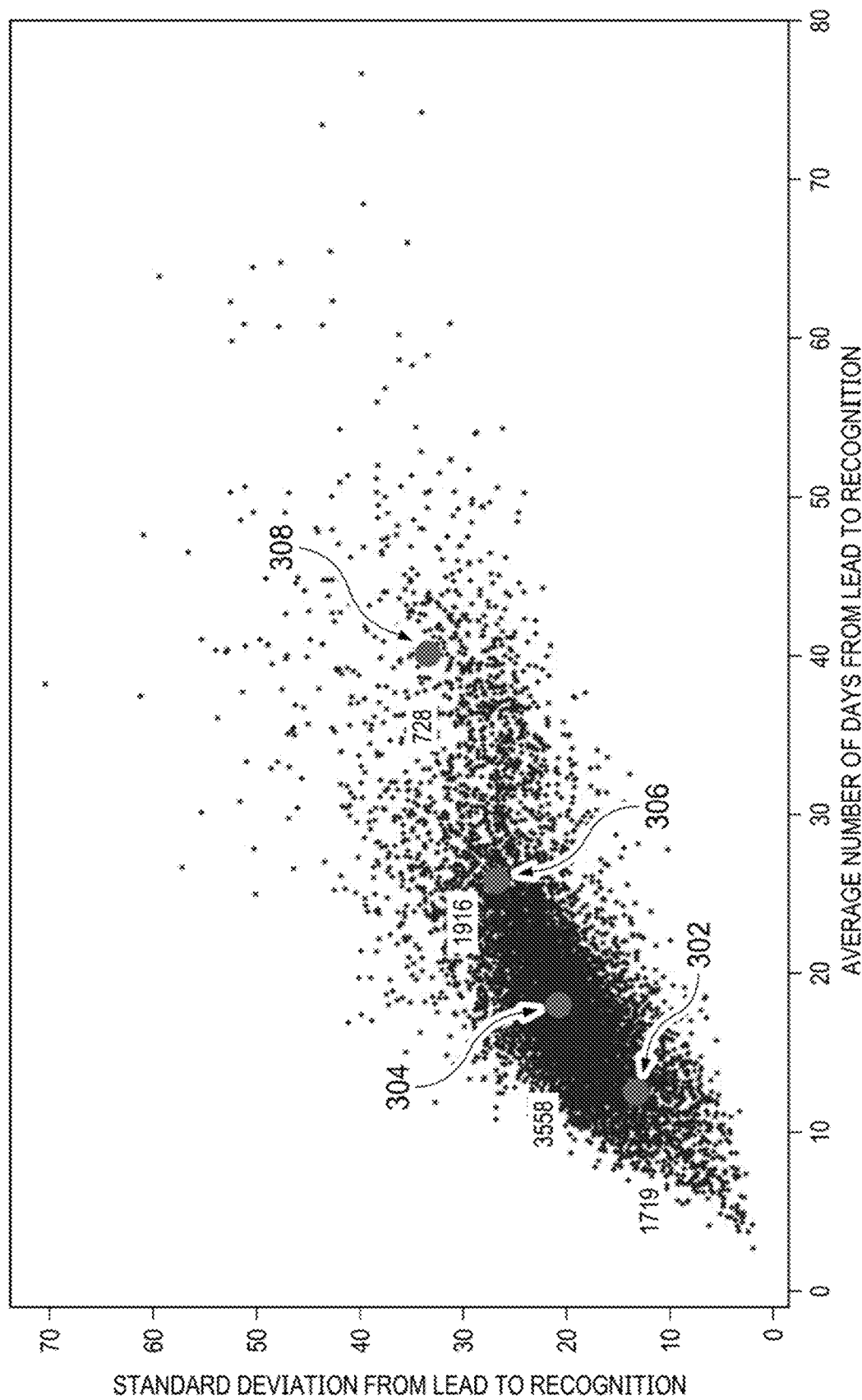
FIG. 3 is a plot diagram that illustrates how dealers can be clustered into different categories based on an average number of days from lead to recognition according to some embodiments disclosed herein.

As a non-limiting example, FIG. 3 is a plot diagram that illustrates clustering (e.g., using k-mean clustering), based on the average number of days from lead to recognition, a plurality of dealers into four categories—a first cluster 302 having 1,719 dealers, a second cluster 304 having 3,558 dealers, a third cluster 306 having 1,916 dealers, and a fourth cluster 308 having 728 dealers. In this way, a new dealer, which may not have many sales and/or leads, can still be categorized into one of the clusters based on lead to recognition characteristics that are similar to those of the dealers in the same cluster. Clustering, therefore, can help the system in handling issues related to data sufficiency in some cases and avoid unnecessary outliers.

In some embodiments, each cluster is associated with a set of rules. Because of the differences in the time delay and standard deviation, the same set of rules applied to the leads and sales data for dealers in the different clusters/categories will result in different time variable close rates 112 being determined by the system (113).

For example, a rule may specify that a time range for consideration is the average delay plus a certain standard deviation (SD) (e.g., plus and minus 2 SD). As a non-limiting example, suppose the standard deviation is 35 days and a rule specifies that the system should consider 1.5 times the standard deviation as the time range for consideration. The system will discard 40 days of recent leads and focus on 50-day worth of data to determine the number of leads in the leads and sales data that should be used in computing the time variable close rate.

In the example of FIG. 3, dealers in the fourth cluster 308 has, on average, a 40-day delay from lead to recognition and a large standard deviation. Thus, the system will discount leads submitted before 20 days (because those leads likely have not been recognized) and focus on leads submitted around 40 days. The system will also consider a longer time range (e.g., from 4-5 months ago to 4-5 days ago at the time of processing the leads for dealers in the fourth category) because the lead to recognition time delay for these dealers is longer and sales are recognized by the system slowly over a longer range of time.

As a non-limiting example, a time variable close rate can be calculated as follows:
- Run a k-means clustering module (e.g., KMeans) to estimate a cluster center of mean and standard deviation of a lead to recognition time delay for each dealer (e.g., a dealer has a lead to recognition time delay mean of 10 days, with a SD of 5).
- Skip leads less than (mean+x*SD) where x is a chosen number (e.g., if x=1, then mean+x*SD=15 days)
- Determine a lead range: 2x*SD (e.g., 2x*SD=2×5=10)

Suppose the time variable close rate is calculated on Day 30 and the length of observation is 25 days. The system is to consider sales occurring from Day 5 to Day 30 in calculating the close rate. However, the system will skip leads that are less than 15 days from Day 30 (because the dealer has a lead to recognition time delay mean of 10 days, with a SD of 5). Thus, the system is to consider leads occurring from Day 5 to Day 15 (i.e., the lead range is 10 days) in calculating the close rate for the dealer (e.g., the number of sales occurring at the dealer from Day 5 to Day 30 divided by the number of leads in the lead range of Day 5 to Day 15). Suppose there are 50 leads from Day 5 to Day 15 and 25 sales from Day 5 to Day 30. In this example, the time variable close rate for the dealer is 50% (i.e., half of the leads that the intermediary sent to the dealer from Day 5 to Day 15 were converted into sales).

Referring to FIG. 3, the close rates for the dealers in each of clusters can be calculated on February 24 as follows:
- first cluster 302, average lead to recognition time delay (i.e., maturation lag)=12 days. Use leads in the lead range of December 1 to January 22 to calculate the time variable close rate for each dealer in the cluster.
- second cluster 304, average lead to recognition time delay=17 days. Use leads in the lead range of October 16 to January 6 to calculate the time variable close rate for each dealer in the cluster.
- third cluster 306, average lead to recognition time delay=25 days. Use leads in the lead range of September 7 to December 21 to calculate the time variable close rate for each dealer in the cluster.
- fourth cluster 308, average lead to recognition time delay=40 days. Use leads in the lead range of July 22 to November 27 to calculate the time variable close rate for each dealer in the cluster.

While different dealers have different lead to recognition time delay characteristics (i.e., maturation lag is dealer dependent), dealers in the same cluster have similar lead to recognition time delay characteristics. Accordingly, time variable close rates for dealers in the same cluster can be calculated using leads from the same time range.

Suppose only dealers with 20 or more leads in the clustering period are considered as having a valid close rate. The remaining dealers with less than 20 leads may fall into a fifth cluster (not shown). For these dealers, the time variable close rate can be calculated using leads within a year from the day the time variable close rate is calculated. For dealers who still do not have a valid close rate, the system may calculate a time variable close rate for each such dealer using a median of the close rates of four dealers closest in proximity to the dealer.

In some embodiments, a dealer's time variable close rate 112 is calculated based on lead to recognition time delay associated with the dealer and adjusted utilizing distance adjustment to close rate 114 (113). This approach solves the following problems: new dealers may not have enough leads (e.g., in a time window) to calculate close rate; dealers may have different delays in matching leads to sales, resulting in biased close rates; dealers distance may play a major role in affecting close rates which, in turn, can affect the accuracy of the close rates thus calculated.

Referring to FIG. 1, distance adjustment to close rate 114 is calculated utilizing leads and sales data 104 and lead distance data 106. Lead distance data 106 represents another input factor for the system to consider in scoring the dealer/make/zip combinations according to method 100.

Generally, a dealer's close rate increases as cumulative time frame increases, due to sales maturation. However, the longer the distance between a lead and a dealer, the less likely for the lead to make a purchase from the dealer. Thus, in some embodiments, method 100 may further include running a regression model on leads and sales data 104 and lead distance data 106 (105). At this stage, the system is operable to generate a distance-based close rate for each lead (e.g., by applying an isotonic regression model) and use the distance-based close rate to adjust the time variable close rate for the respective lead (113).

Figure 4A:
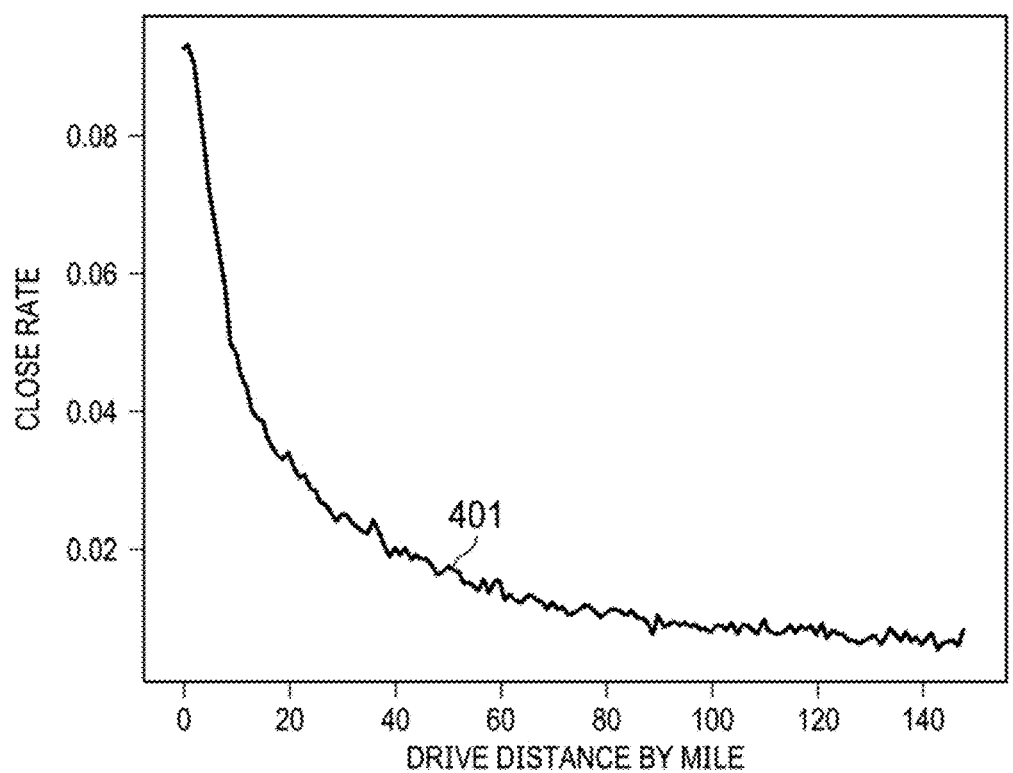
FIG. 4A is a plot diagram showing a close rate by distance curve according to some embodiments disclosed herein.
Figure 4B:
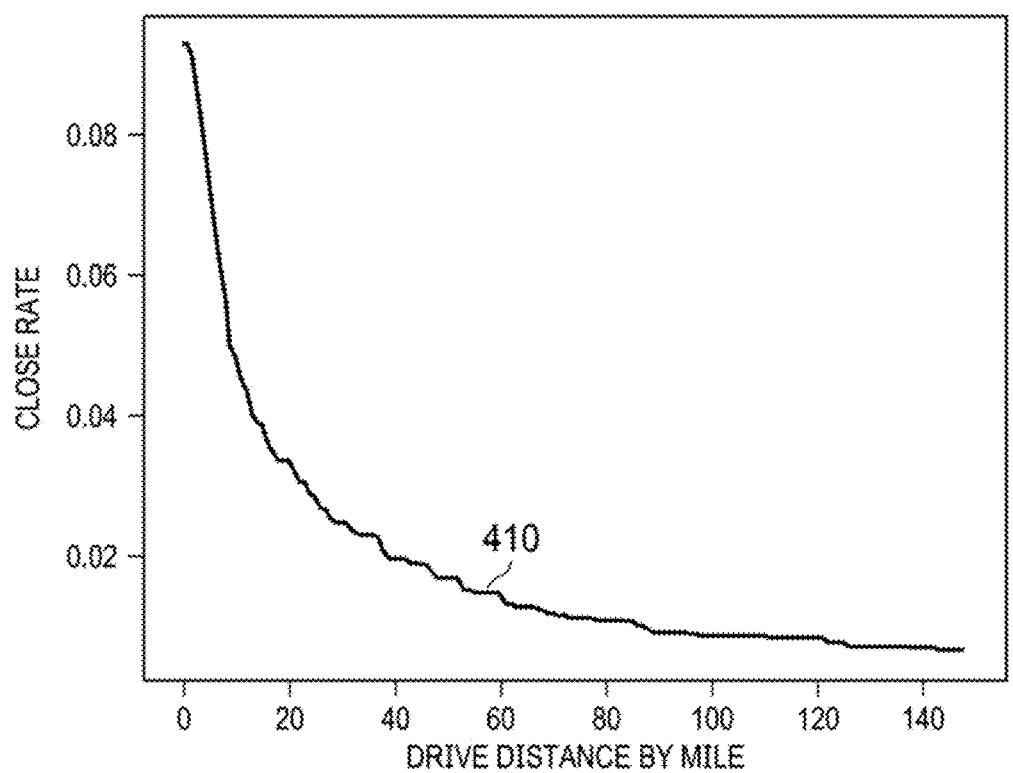
FIG. 4B is a plot diagram showing a close rate by distance curve after application of isotonic regression according to some embodiments disclosed herein.

Skilled artisans appreciate that isotonic regression refers to the technique of fitting a free-form line to a sequence of observations such that the fitted line is non-decreasing (or non-increasing) and lies as close to the observations as possible. FIG. 4A is a plot diagram showing close rate by distance curve 401 before application of isotonic regression. FIG. 4B is a plot diagram showing a smoother close rate by distance curve 410 after application of isotonic regression. Isotonic regression is known to those skilled in the art and thus is not further described herein.

Figure 5:
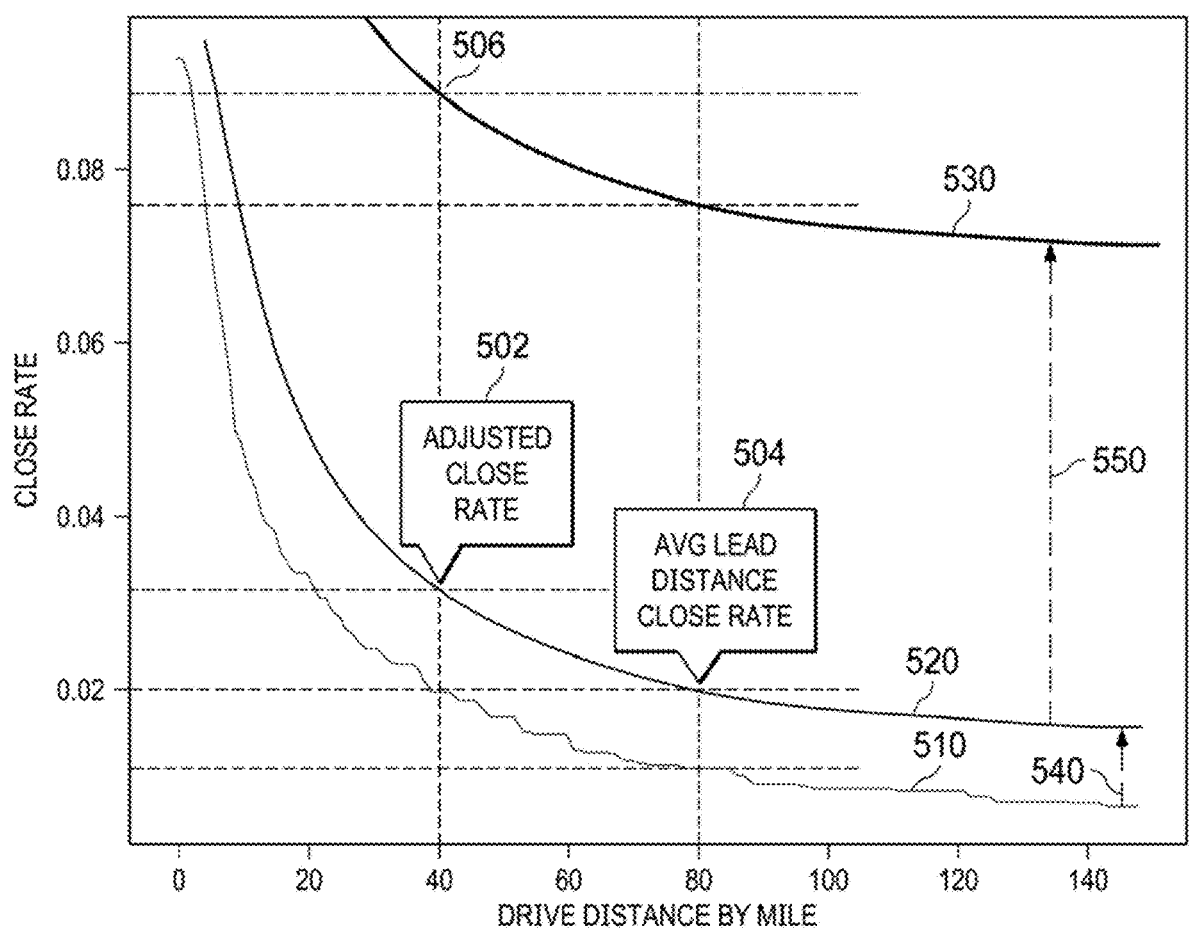
FIG. 5 is a plot diagram that shows a national average close rate relative to an average lead distance according to some embodiments disclosed herein.

In some embodiments, the system is adapted for handling distance adjustment issues. For example, curve 510 shown in FIG. 5 represents the national average close rate relative to the average lead distance, after running an isotonic regression to make sure that curve 510 is monotonically decreasing with distance.

Suppose that a dealer has an average lead distance close rate of 2% at an average lead distance of 80 miles. This means that the dealer's average time variable close rate, with a distance adjustment applied (which is referred to as "lead distance close rate"), is 1% higher than the national average lead distance close rate at the same lead distance of 80 miles. The system can shift curve 510 upwards (as indicated by arrow 540) as new curve 520 (e.g., by making a copy of curve 510) to represent the dealer's average lead distance close rate 504 relative to the national average lead distance close rate at the same lead distance of 80 miles.

The system can utilize this new curve 520 to quickly find an adjusted close rate for a new lead. For instance, a new lead has a lead distance at 40 miles. The system can utilize curve 520 to quickly find adjusted close rate 502 of 3% for the new lead at 40 miles, as compared to the national average lead distance close rate of 2% at the lead distance of 40 miles (because the dealer's average close rate per curve 520 is 1% higher than the national average lead distance close rate per curve 510). If the dealer's average close rate is 1% lower than the national average lead distance close rate at the lead distance of 80 miles, the system can shift curve 510 downwards (not shown).

Figure 6A:
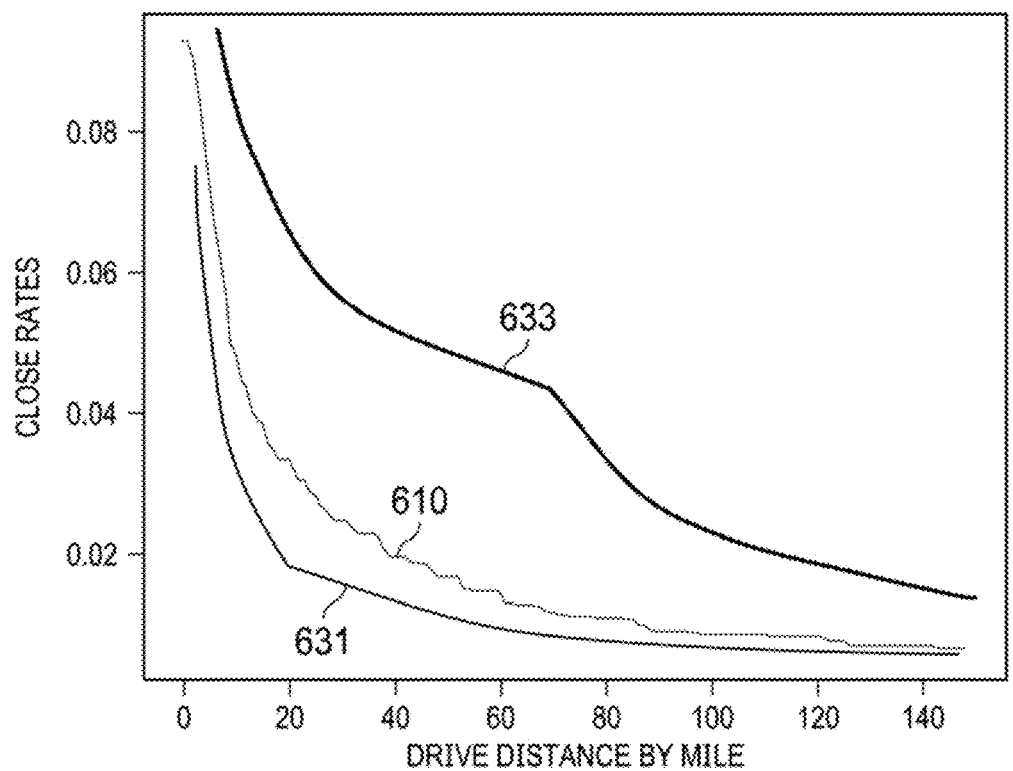
FIG. 6A is a plot diagram that shows how a system may leverage a decaying differential technique such that a dealer's curve eventually converges to a national average curve according to some embodiments disclosed herein.
Figure 6B:
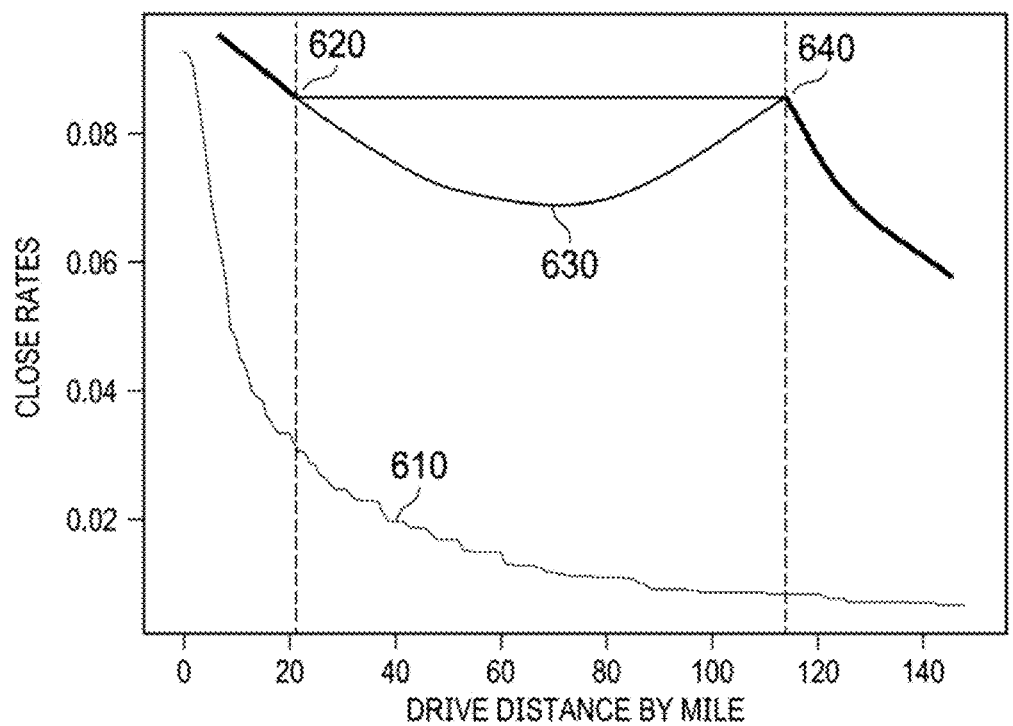
FIG. 6B is a plot diagram that shows how, if a dealer has a non-decreasing curve as a lead distance increases, a system may apply an upper bound and a lower bound according to some embodiments disclosed herein.

The system is adapted for determining whether an upward or downward shift is reasonable. For instance, a dealer may have an average close rate 506 of more than 8% at an average lead distance of 40 miles. As represented by curve 530, this upward shift (as indicated by arrow 550) significantly exceeds the national average close rate of 2% at the average lead distance of 40 miles. To address this issue, the system may leverage a decaying differential technique so that the dealer's curve (e.g., curves 631, 633 shown in FIG. 6A) will eventually converge to the national average (e.g., curve 610 shown in FIGS. 6A-6B). Additionally or alternatively, if a dealer has a non-decreasing curve as the lead distance increases (e.g., curve 630 shown in FIG. 6B), the system may apply an upper bound and a lower bound (e.g., using another dealer's close rate as the lower bound 620 and the upper bound 640, as shown in FIG. 6B).

Referring to FIG. 1, in some embodiments, the database is populated with records containing lead to recognition time delay data 102, leads and sales data 104, lead distance data 106, time variable close rate data 112, and distance adjustment to close rate data 114 for all zip codes in a geographical region. As a non-limiting example, suppose there are 10,000 zip codes (which may be referred to as lead zip codes because leads may be associated with these zip codes) in the U.S. and up to 20 dealers (each of which may reside at a dealer zip code) are in or proximate to each respective lead zip code, the system may populate or update 200,000 records in the database, each record corresponding to a lead zip code and a dealer zip code.

Each record may also contain a lead distance determined based on the lead zip code and the dealer zip code. Further, the distance adjustment discussed above can be applied to the time variable close rate for each of the 20 dealers and stored in the database. In this way, when a website visitor in a particular zip code 90401 submits a lead through a website supported by the system, the system can access the database and quickly (e.g., in real time plus potential network and/or operational delays) provide up to 20 dealers near zip code 90401 for the new lead and, from lead to recognition time delay data 102, leads and sales data 104, and lead distance data 106, the system would have already calculated the lead distance between zip code 90401 and each of the 20 dealers and the time variable close rate for each of the 20 dealers as adjusted by the lead distance between zip code 90401 and the dealer zip code.

In some embodiments, method 100 may further include populating the database with average dealer level % discount 122, predicted close rate for each lead 124, and address drive distance for each lead 126 (125). Here, address drive distance for each lead 126 represents a distance between a dealer's address to the center of a zip code for a lead. In some embodiments, the system may determine a predicted close rate for each lead in a lead zip code based on the time variable close rate of a dealer near the lead zip code, as adjusted by the lead distance between the dealer (e.g., per a dealer zip code where the dealer is located) and the lead zip code of the respective lead (117). In some embodiments, the system may also determine average dealer level % discount 122 and address drive distance for each lead 126 from leads and sales data 104.

As illustrated in FIG. 1, average dealer level % discount 122, predicted close rate for each lead 124, and address drive distance for each lead 126 thus determined by the system can be provided as inputs to logistic regression model 127 (which implements a supervised machine learning algorithm). Generally, logistic regression measures the relationship between a categorical dependent variable Y and one or more independent variables x's by estimating probabilities using a logistic function. In regression analysis, logistic regression estimates the parameters β (also referred to as coefficients or weights) of a logistic model, i.e., finding the β parameters that best fit:

$$Y = \begin{cases} 1 & \beta_0 + \beta_1 x + \ldots + \varepsilon > 0 \\ 0 & \text{else} \end{cases}$$

where ε is an error distributed by the standard logistic distribution as known to those skilled in the art.

In this case, variable Y is predictive to whether each lead turns into a sale or not, based on historical records of six months of leads to sales, for instance. The parameters of logistic regression model 127 may differ from implementation to implementation. Other parameters may also be considered. Logistic regression is known to those skilled in the art and thus is not further described herein.

In some embodiments, logistic regression model 127 may be trained in an offline process (e.g., on a daily basis) and trained model 134 may be used in conjunction with information relating to closest dealers in drive distance for each zip code and vehicle configuration (e.g., make, YMMB/T, etc.) combination 132 to provide batch prediction 139. A goal of logistic regression model 127 is to predict which of the 20 dealers in or near a zip code has the best chance of selling a vehicle of a particular vehicle configuration to a lead in the zip code. Accordingly, batch prediction 139 may produce scores 142, each for a combination of a dealer, make, and zip code in the database, indicating a probability of closing a sale between a lead in the zip code looking to purchase a vehicle having the vehicle configuration from the dealer in the combination. As another example, a logistic regression model may be trained in a real time process (e.g., via a service which collects leads and sales data from various systems and endpoints) that utilizes user feedback to fine tune the logistic regression model.

In some embodiments, the logistic regression model models various scenarios involving dealers in or near a zip code. For instance, 20 dealers including dealer x, dealer y, dealer z, and so on in or near zip code 90401 can first be ranked based on respective lead distances (e.g., dealer z in the first position, dealer y in the second position, dealer x in the third position, etc.). Based on past sales, dealer x historically has had a higher close rate than other dealers in or near zip code 90401. Based on historical dealer discount information, dealer y historically has had a better dealer-level price discount. Based on these and/or other factors (e.g., customer satisfaction rates, etc.), the regression model may adjust the ranking of the 20 dealers in or near zip code 90401. For example, because dealer x has a predicted close rate higher than other dealers in or near zip code 90401, the ranking of dealer x is adjusted to the first position. In this way, when a website visitor from zip code 90401 submits a lead to the system (e.g., through a website supported by the system), the system is operable to access the database and recommend dealer x to the website visitor by presenting dealer x as the first choice for the website visitor. In some embodiments, the system may recommend up to five dealers, ranked by the system using the trained model, to the website visitor.

In some embodiments, results from method 100 may be stored in a separate database accessible by an auto-buying platform (ABP). FIG. 7 illustrates a non-limiting example of a database 700 storing information that can be queried by the ABP. In response to a user of the ABP looking to purchase a vehicle of a certain make (e.g., Honda) in zip code 90401, the ABP may query database 700 (e.g., based on user-provided vehicle information, identified by the ABP as "make_id=43," and the zip code of interest, represented by "postal_code=501"), find 20 dealers in or near the zip code of interest that carry the make of interest, and recommend top five dealers from the 20 dealers thus found.

In the example of FIG. 7, database 700 is sorted by "address_drive_distance" which measures the distance between a dealer's address and the center of a corresponding postal code. However, the dealers (which are identified by "dealership_id") can be ranked by the logistic regression algorithm based on their respective time variable close rate after a corresponding lead distance adjustment. For example, although a dealer (identified by dealership_id=119489) is ranked in the fifth position (distance_rank=5) based on address_drive_distance, it is ranked in the third position based on lead_dist_clr_after_adj which shows that the dealer has the third highest time variable close rate after adjusted based on a lead distance between the dealer and the lead. Because dealers in or near the zip code of interest have already been ranked by the logistic regression algorithm, the ABP can recommend, based on the corresponding ranking stored in database 700, the top five dealers in the zip code of interest (e.g., postal_code=501) carrying the vehicle make of interest (e.g., "make_id=43") to the user of the ABP. In this case, the time variable close rate stored in database 700 is calculated per dealer per make, and adjusted by lead distance. In other implementations, the time variable close rate may be calculated per dealer per vehicle configuration (e.g., YMMB/T), and adjusted by lead distance.

In some cases, dealer-specified rules may be applied to further tweak the list of recommended dealers. For example, a dealer may have a non-competing rule not to be presented with a competitor in the same zip code. If both the dealer and the competitor are ranked in the top five positions, application of the non-competing rule may remove the dealer from the list of recommended dealers. Other rules may apply.

The user may wish to contact a dealer thus recommended (e.g., by selecting the dealer from the list of recommended dealers presented to the user). In response, information about the user can be communicated as a lead to a dealer portal for the dealer. The dealer may, in turn, respond to the lead (e.g., through the dealer portal or other communication channel(s)).

Figure 8:
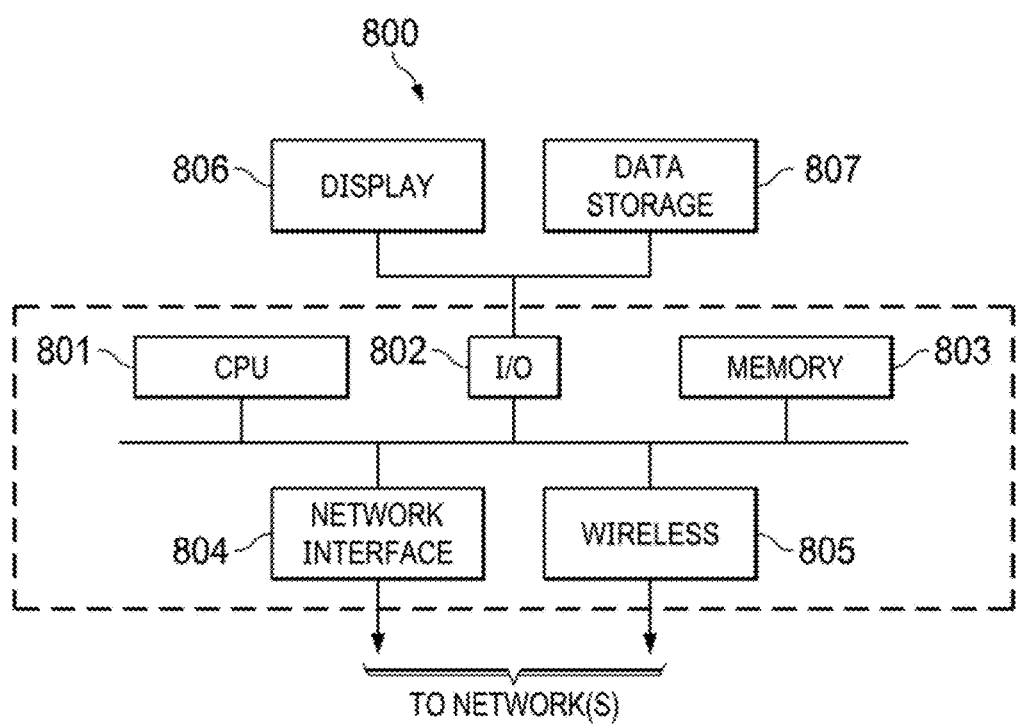
FIG. 8 depicts a diagrammatic representation of a data processing system for implementing an embodiment disclosed herein.

FIG. 8 depicts a diagrammatic representation of a data processing system for implementing an embodiment disclosed herein. As shown in FIG. 8, data processing system 800 may include one or more central processing units (CPU) or processors 801 coupled to one or more user input/output (I/O) devices 802 and memory devices 803. Examples of I/O devices 802 may include, but are not limited to, keyboards, displays, monitors, touch screens, printers, electronic pointing devices such as mice, trackballs, styluses, touch pads, or the like. Examples of memory devices 703 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 800 can be coupled to display 806, information device 807 and various peripheral devices (not shown), such as printers, plotters, speakers, etc. through I/O devices 802. Data processing system 800 may also be coupled to external computers or other devices through network interface 804, wireless transceiver 805, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips.

Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. The scope of the present disclosure should be determined by the following claims and their legal equivalents.

What is claimed is:

1. A method, comprising:
    retrieving, from a database by a system executing on a processor, lead to recognition time delay data, leads and sales data, and lead distance data for leads arriving at the system within a time range, wherein the lead to recognition time delay data comprises a time delay between a first date when a dealer makes a sale and a second date when transaction data corresponding to the sale is recorded by the system, the leads and sales data containing leads submitted to the system through a website supported by the system, the lead distance data comprising lead distances, each of the lead distances corresponding to a driving distance between a dealer zip code and a lead zip code;
    applying, by the system, a clustering model to the lead to recognition time delay data and the leads and sales data, the clustering model producing a plurality of clusters, each of the plurality of clusters having a plurality of dealers, the plurality of dealers having comparable lead to recognition time delay characteristics;
    determining, by the system for the plurality of dealers in each of the plurality of clusters, a time variable close rate per dealer per make;

determining, by the system, a distance adjustment for the time variable close rate thus determined per dealer per make based on a corresponding lead distance;

determining, by the system, a predicted close rate for each of the leads in the leads and sales data based on the time variable close rate determined per dealer per make and the distance adjustment for the time variable close rate thus determined per dealer per make;

providing, by the system, the predicted close rate for each of the leads in the leads and sales data as input to a logistic regression model;

training, by the system, the logistic regression model using the predicted close rate for each of the leads in the leads and sales data, an address drive distance for each of the leads in the leads and sales data, and dealer-level discount information, wherein the logistic regression model thus trained generates a score for each combination of a dealer, make, and zip code, the score indicating a probability of closing a sale between a lead in the zip code looking to purchase a vehicle of the make from the dealer in the combination; and providing, by the system, the score to a computing facility, wherein the computing facility is configured for recommending a list of dealers based at least in part on scores generated by the logistic regression model thus trained.

2. The method according to claim 1, wherein the clustering model comprises a k-means algorithm.

3. The method according to claim 1, wherein each of the plurality of clusters is associated with a set of rules and wherein the set of rules comprises a rule that specifies the time range.

4. The method according to claim 1, wherein the leads and sales data comprises sales occurring in a period of time that begins before the leads arriving at the system within the time range.

5. The method according to claim 1, further comprising:

comparing a time variable close rate of a dealer as adjusted by a distance adjustment, which is determined based on a first lead distance, with a national average close rate at the first lead distance; and shifting a curve representing national average close rates across different lead distances upwards or downwards as a new curve that represents average lead distance close rates of the dealer across the different lead distances.

6. The method according to claim 5, further comprising:
utilizing the new curve to locate an adjusted close rate of the dealer for a new lead at a second lead distance that is different from the first lead distance.

7. The method according to claim 5, further comprising:
applying a decaying differential technique to the new curve so that the new curve converges to the curve representing the national average close rates across the different lead distances.

8. A system, comprising:
a processor;
a non-transitory computer-readable medium; and
stored instructions translatable by the processor for:

retrieving, from a database, lead to recognition time delay data, leads and sales data, and lead distance data for leads arriving at the system within a time range, wherein the lead to recognition time delay data comprises a time delay between a first date when a dealer makes a sale and a second date when transaction data corresponding to the sale is recorded by the system, the leads and sales data containing leads submitted to the system through a website supported by the system, the lead distance data comprising lead distances, each of the lead distances corresponding to a driving distance between a dealer zip code and a lead zip code;

applying a clustering model to the lead to recognition time delay data and the leads and sales data, the clustering model producing a plurality of clusters, each of the plurality of clusters having a plurality of dealers, the plurality of dealers having comparable lead to recognition time delay characteristics;

determining, for the plurality of dealers in each of the plurality of clusters, a time variable close rate per dealer per make;

determining a distance adjustment for the time variable close rate thus determined per dealer per make based on a corresponding lead distance;

determining a predicted close rate for each of the leads in the leads and sales data based on the time variable close rate determined per dealer per make and the distance adjustment for the time variable close rate thus determined per dealer per make;

providing the predicted close rate for each of the leads in the leads and sales data as input to a logistic regression model;

training the logistic regression model using the predicted close rate for each of the leads in the leads and sales data, an address drive distance for each of the leads in the leads and sales data, and dealer-level discount information, wherein the logistic regression model thus trained generates a score for each combination of a dealer, make, and zip code, the score indicating a probability of closing a sale between a lead in the zip code looking to purchase a vehicle of the make from the dealer in the combination; and providing the score to a computing facility, wherein the computing facility is configured for recommending a list of dealers based at least in part on scores generated by the logistic regression model thus trained.

9. The system of claim 8, wherein the clustering model comprises a k-means algorithm.

10. The system of claim 8, wherein each of the plurality of clusters is associated with a set of rules and wherein the set of rules comprises a rule that specifies the time range.

11. The system of claim 8, wherein the leads and sales data comprises sales occurring in a period of time that begins before the leads arriving at the system within the time range.

12. The system of claim 8, wherein the stored instructions are further translatable by the processor for:

comparing a time variable close rate of a dealer as adjusted by a distance adjustment, which is determined based on a first lead distance, with a national average close rate at the first lead distance; and shifting a curve representing national average close rates across different lead distances upwards or downwards as a new curve that represents average lead distance close rates of the dealer across the different lead distances.

13. The system of claim 12, wherein the stored instructions are further translatable by the processor for:

utilizing the new curve to locate an adjusted close rate of the dealer for a new lead at a second lead distance that is different from the first lead distance.

14. The system of claim 12, wherein the stored instructions are further translatable by the processor for:
applying a decaying differential technique to the new curve so that the new curve converges to the curve representing the national average close rates across the different lead distances.

15. A computer program product comprising a non-transitory computer-readable medium storing instructions translatable by a processor of a system for:
retrieving, from a database, lead to recognition time delay data, leads and sales data, and lead distance data for leads arriving at the system within a time range, wherein the lead to recognition time delay data comprises a time delay between a first date when a dealer makes a sale and a second date when transaction data corresponding to the sale is recorded by the system, the leads and sales data containing leads submitted to the system through a website supported by the system, the lead distance data comprising lead distances, each of the lead distances corresponding to a driving distance between a dealer zip code and a lead zip code;
applying a clustering model to the lead to recognition time delay data and the leads and sales data, the clustering model producing a plurality of clusters, each of the plurality of clusters having a plurality of dealers, the plurality of dealers having comparable lead to recognition time delay characteristics;
determining, for the plurality of dealers in each of the plurality of clusters, a time variable close rate per dealer per make;
determining a distance adjustment for the time variable close rate thus determined per dealer per make based on a corresponding lead distance;
determining a predicted close rate for each of the leads in the leads and sales data based on the time variable close rate determined per dealer per make and the distance adjustment for the time variable close rate thus determined per dealer per make;
providing the predicted close rate for each of the leads in the leads and sales data as input to a logistic regression model;
training the logistic regression model using the predicted close rate for each of the leads in the leads and sales data, an address drive distance for each of the leads in the leads and sales data, and dealer-level discount information, wherein the logistic regression model thus trained generates a score for each combination of a dealer, make, and zip code, the score indicating a probability of closing a sale between a lead in the zip code looking to purchase a vehicle of the make from the dealer in the combination; and
providing the score to a computing facility, wherein the computing facility is configured for recommending a list of dealers based at least in part on scores generated by the logistic regression model thus trained.

16. The computer program product of claim 15, wherein the clustering model comprises a k-means algorithm.

17. The computer program product of claim 15, wherein each of the plurality of clusters is associated with a set of rules and wherein the set of rules comprises a rule that specifies the time range.

18. The computer program product of claim 15, wherein the leads and sales data comprises sales occurring in a period of time that begins before the leads arriving at the system within the time range.

19. The computer program product of claim 15, wherein the instructions are further translatable by the processor for:
comparing a time variable close rate of a dealer as adjusted by a distance adjustment, which is determined based on a first lead distance, with a national average close rate at the first lead distance; and
shifting a curve representing national average close rates across different lead distances upwards or downwards as a new curve that represents average lead distance close rates of the dealer across the different lead distances.

20. The computer program product of claim 19, wherein the instructions are further translatable by the processor for:
utilizing the new curve to locate an adjusted close rate of the dealer for a new lead at a second lead distance that is different from the first lead distance.

* * * * *